(12) United States Patent
Hu et al.

(10) Patent No.: US 9,903,462 B2
(45) Date of Patent: Feb. 27, 2018

(54) PLANETARY GEAR TRANSMISSION

(71) Applicant: Johnson Electric S.A., Murten (CH)

(72) Inventors: Hua Hu, Shenzhen (CN); Carl Henric Andreas Svensson, Bor (SE); Thomas Roschke, North Hampton, NH (US); Mohanlal Ramadoss, Hong Kong (CN)

(73) Assignee: Johnson Electric S.A., Murten (CH)

( * ) Notice: Subject to any disclaimer, the term of this patent is extended or adjusted under 35 U.S.C. 154(b) by 216 days.

(21) Appl. No.: 14/854,472

(22) Filed: Sep. 15, 2015

(65) Prior Publication Data
US 2016/0076622 A1 Mar. 17, 2016

(30) Foreign Application Priority Data

Sep. 15, 2014 (CN) .......................... 2014 1 0468389

(51) Int. Cl.
F16H 1/46 (2006.01)
F16H 57/02 (2012.01)
F16H 57/021 (2012.01)
F16H 57/023 (2012.01)

(52) U.S. Cl.
CPC ............ F16H 57/021 (2013.01); F16H 1/46 (2013.01); F16H 57/023 (2013.01)

(58) Field of Classification Search
CPC ........ F16H 57/021; F16H 57/023; F16H 1/46; F16H 57/08; F16H 3/64
See application file for complete search history.

(56) References Cited

U.S. PATENT DOCUMENTS

| 8,216,107 | B2 | 7/2012 | Tao et al. | |
| 8,585,124 | B2 | 11/2013 | Oberle et al. | |
| 2004/0045389 | A1* | 3/2004 | Pascoe | F16H 55/17 74/434 |
| 2009/0188029 | A1* | 7/2009 | Ta | A47K 13/10 4/246.1 |
| 2011/0196375 | A1* | 8/2011 | Li | H02K 7/116 606/80 |
| 2013/0269305 | A1* | 10/2013 | Wang | A01D 34/00 56/14.7 |
| 2013/0274049 | A1* | 10/2013 | Zhu | F16H 1/28 475/149 |

* cited by examiner

Primary Examiner — Stacey Fluhart
(74) Attorney, Agent, or Firm — Muncy, Geissler, Olds & Lowe, P.C.

(57) ABSTRACT

A planetary gear transmission has a gearbox, multiple stages of planetary gears, and an output shaft. Except for the last stage, each planetary gear stage shares a common first internal gear ring. Each stage has a sun gear, a planet carrier, and multiple planet gears. The sun gear of each stage, except for the first stage is integrally formed with or fixed to the planet carrier of an immediately preceding stage. The last stage of the transmission has a second internal gear ring. The planet gears of the last stage mesh with the second internal gear ring. The second internal gear ring includes a support portion, and the output shaft passes through and is rotatably supported by the support portion.

13 Claims, 5 Drawing Sheets

PLANETARY GEAR TRANSMISSION

CROSS REFERENCE TO RELATED APPLICATIONS

This non-provisional patent application claims priority under 35 U.S.C. § 119(a) from Patent Application No. 201410468389.2 filed in The People's Republic of China on Sep. 15, 2014, the entire contents of which are hereby incorporated by reference.

FIELD OF THE INVENTION

This invention relates to gear transmissions and in particular, to a planetary gear transmission for medical devices.

BACKGROUND OF THE INVENTION

Planetary gear transmissions are widely used in a variety of industrial applications due to its good performance and low cost. This type of transmission has a small size, light weight, high load-carrying capacity, long lifespan, low noise and can be operated steadily.

The planetary gear transmissions are commonly used in medical devices to transmit high torque through a compact package. The planetary gear transmissions used as such have short operating cycles and are required to have a small size.

FIG. 1 is a sectional view of a conventional multi-stage planetary gear transmission. This planetary gear transmission includes a gearbox 100 completely made of plastic. The last stage of planetary gear transmission supports an output shaft 300 via a shaft sleeve 200. Because the gearbox 100 is completely made of plastic, an internal gear ring 400 formed on an inner circumferential surface of the gearbox 100 is also completely made of plastic, which limits the capability of the planetary gear transmission for transmitting torque.

FIG. 2 is a sectional view of another conventional planetary gear transmission. The gearbox 101 of this planetary gear transmission is made of a metal material such as steel or aluminum, which leads to high cost. In addition, a separate rolling bearing 201 is required to support the output shaft 301 which leads to a large size, complex structure and complicated manufacturing process.

SUMMARY OF THE INVENTION

Hence there is a desire for an improved planetary gear transmission which is low cost but can handle high torque loading.

Accordingly, in one aspect thereof, the present invention provides a planetary gear transmission comprising a gearbox, multiple planetary gear stages mounted in the gearbox, and an output shaft mounted at an end of the multiple stages and connected with the last stage; wherein, except for the last stage, each stage shares a common first internal gear ring formed on or fixed to an inner circumferential surface of the gearbox, each stage comprises a sun gear, a planet carrier having multiple axles extending from an end face of the planet carrier, and a plurality of planet gears respectively mounted on the axles and meshed with the respective sun gear and the first internal gear ring; wherein the last stage comprises a second internal gear ring mounted in the gearbox, a sun gear located within the second internal gear ring, and a plurality of planet gears meshing with the second internal gear ring and the respective sun gear, the output shaft forming a planet carrier rotatably supporting the planet gears of the last stage; wherein, except for the first stage, the sun gear of each stage is integrally formed with or fixed to the planet carrier of an immediately preceding stage; and wherein the second internal gear ring comprises a support portion, and the output shaft passes through and is rotatably supported by the support portion.

Preferably, the output shaft comprises a first shaft shoulder at an end of the output shaft close to the planetary gear stages, a plurality of through holes is defined through the shaft shoulder, a plurality of pins passes through the through holes to connect to the planet gears of the last stage.

Preferably, the output shaft comprises a second shaft shoulder at the end of the output shaft close to the planetary gear stages, the second shaft shoulder abuts against an end face of the second internal gear ring in an axial direction of the output shaft.

Preferably, the second internal gear ring further comprises a meshing portion at one end of the support portion, the meshing portion is greater in diameter than the support portion, an inner surface of the meshing portion is formed with internal teeth for meshing with the planet gears of the last stage, and the meshing portion is mounted in the gearbox.

Preferably, axial ribs are formed on an outer circumferential surface of the meshing portion of the second internal gear ring, protrusions are formed on an end face of the meshing portion remote from the support portion, the inner circumferential surface of the gearbox forms multiple grooves corresponding to the ribs of the second internal gear ring, an end face of the gearbox that contacts the second internal gear ring forms multiple recesses, the ribs are respectively engaged in the grooves, and the protrusions are respectively engaged in the recesses.

Preferably, an end face of the meshing portion close to the support portion forms an annular protrusion that is coaxial with the second internal gear ring.

Preferably, a groove is formed in one end of the output shaft extending out of the support portion of the second internal gear ring, a retaining ring is disposed in the groove, the diameter of the second shaft shoulder is greater than the diameter of the output shaft, and the diameter of the first shaft shoulder is greater than the diameter of the second shaft shoulder.

Preferably, a washer is disposed between the retaining ring and an end face of the support portion of the second internal gear ring.

Preferably, an outer circumferential surface of an end of the gearbox adjacent the output shaft comprises multiple mounting portions, and each mounting portion defines a through hole in an axial direction of the gearbox.

Preferably, a material of the gearbox is plastic, and the second internal gear ring is metal and made by a sintered metal powder process.

Preferably, the second internal gear ring includes a detent mechanism for coupling with a device to be driven by the output shaft such that torque is transmittable via the detent mechanism to the device to be driven.

Preferably, the detent mechanism comprises multiple projections, recesses or grooves formed on an outer circumferential surface of the second internal gear ring for engaging with the device to be driven.

Preferably, the second internal gear ring has a torsional strength greater than that of a housing of the gearbox.

According to a second aspect, the present invention provides a planetary gear transmission assembly comprising a motor and a planetary gear transmission as described above. The planetary gear transmission is driven by the motor.

In view of the foregoing, in the planetary gear transmission as discussed above, by providing the second internal gear ring, a large part of the torque can be transmitted to the device to be driven by the second internal gear ring, thus reducing the torque load on the housing of the gearbox and hence enhancing the overall torsional strength of the gearbox. In addition, this allows the gearbox to have a simplified and compact structure, and reduces the manufacturing cost. Accumulated axial tolerance may also be reduced.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
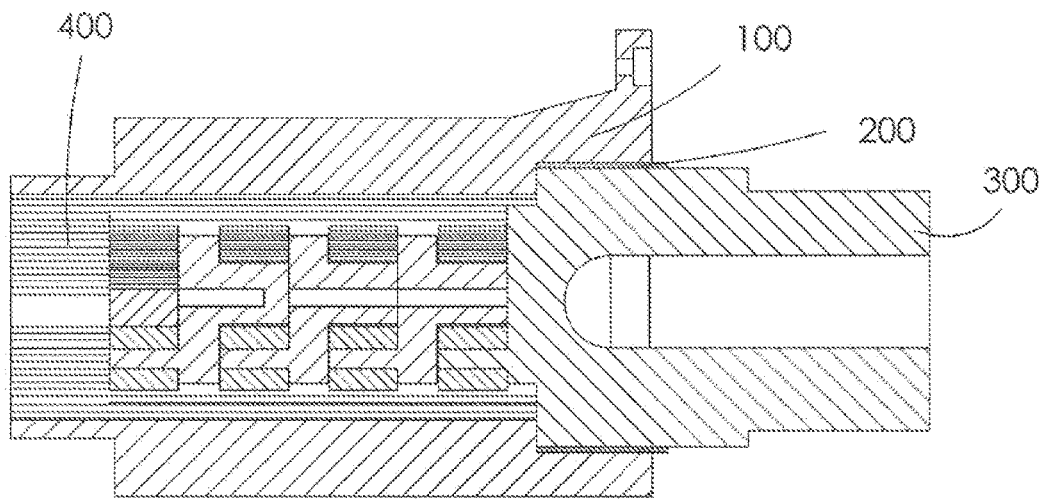
FIG. 1 is a sectional view of a conventional planetary gear transmission.
Figure 2:
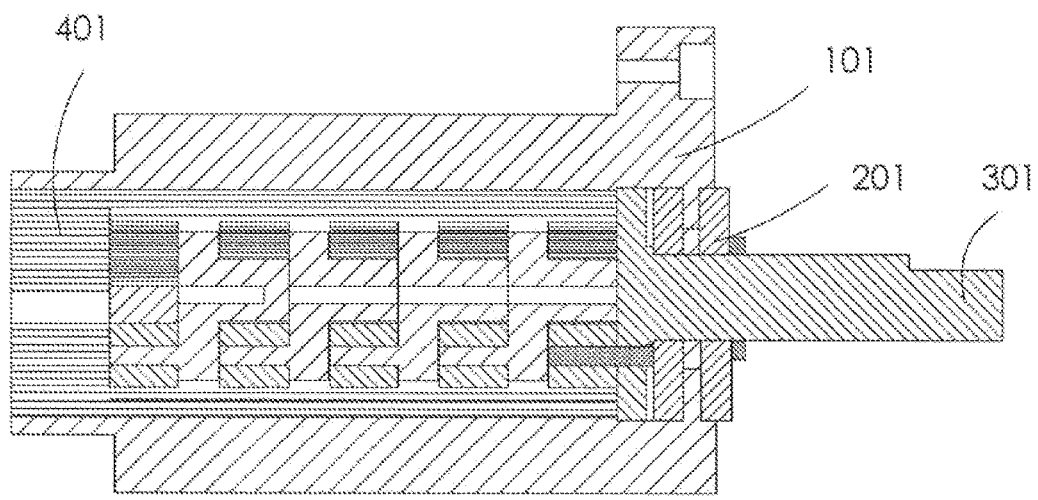
FIG. 2 is a sectional view of another conventional planetary gear transmission.

FIGS. 3 to 7 illustrate a planetary gear transmission in accordance with a first embodiment of the present invention. The transmission includes a gearbox 1, multiple planetary gear stages mounted in the gearbox 1, and an output shaft 3 mounted at an end of the stages and connected with the last stage. Except for the last stage, each stage shares a first internal gear ring 11 formed on an inner circumferential surface of the gearbox 1. Each stage has a sun gear 4 disposed on an axis of the gearbox 1, a planet carrier 41 mounted coaxially with respect to the sun gear 4 and having multiple axles extending from an end face of the planet carrier 41, and multiple planet gears 5 respectively mounted on the axles 42 and meshed with the sun gear 4 and the first internal gear ring 11. The sun gear 4 of each stage, except the first stage, is integrally formed with or fixed to the planet carrier 41 of an immediately preceding stage of planetary gear transmission section. The sun gear for the first stage is the pinion on the motor arranged to drive the transmission.

Figure 4:
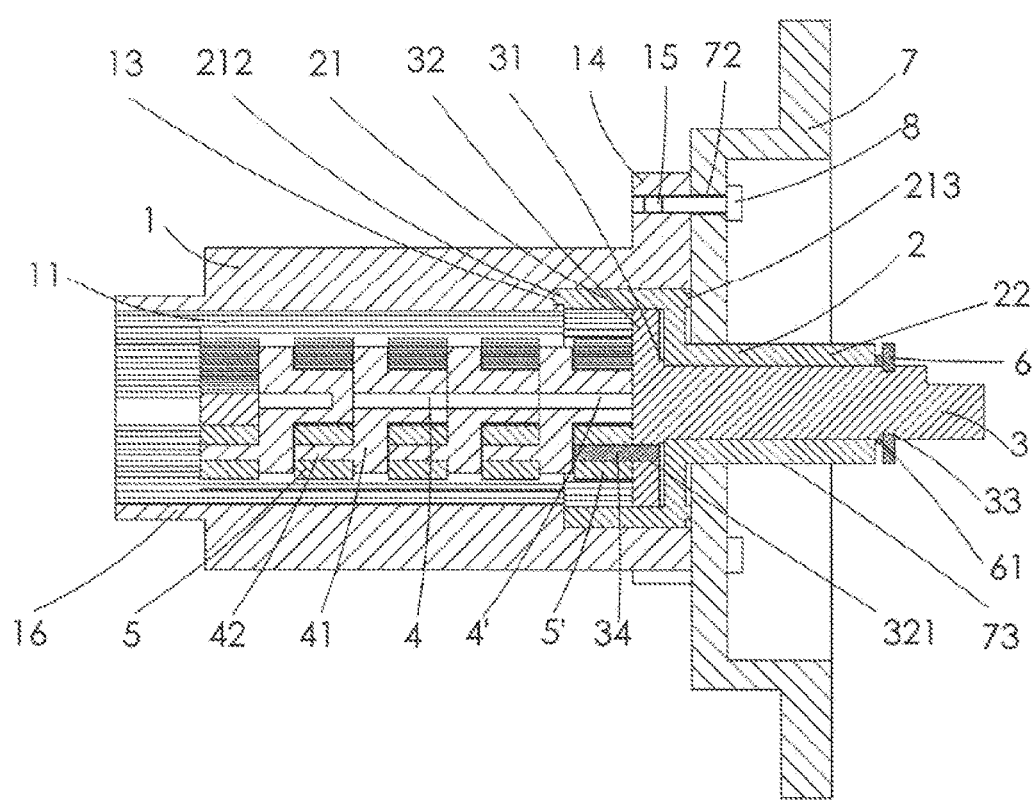
FIG. 4 is a sectional view of the planetary gear transmission of FIG. 3.
Figure 6:
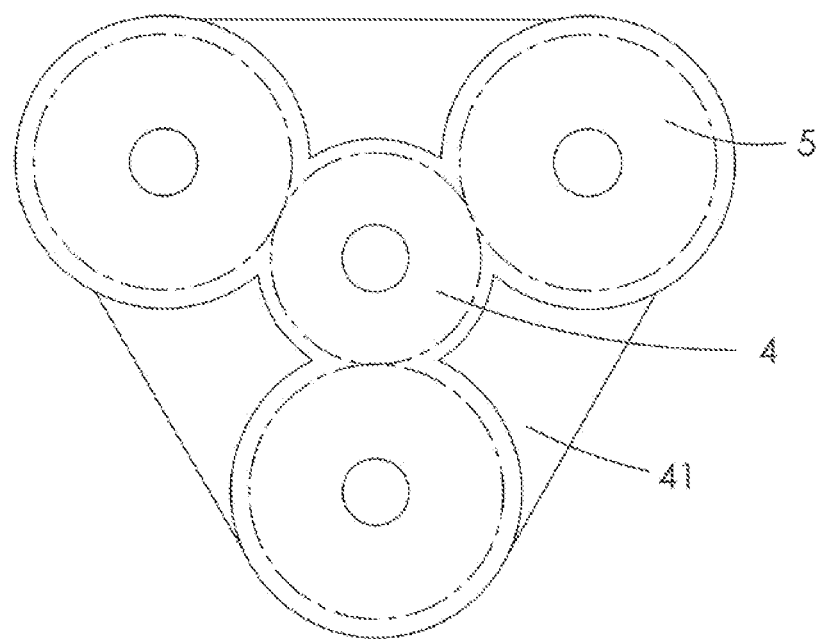
FIG. 6 illustrates a sun gear and planetary gears of the planetary gear transmission of FIG. 3.
Figure 7:
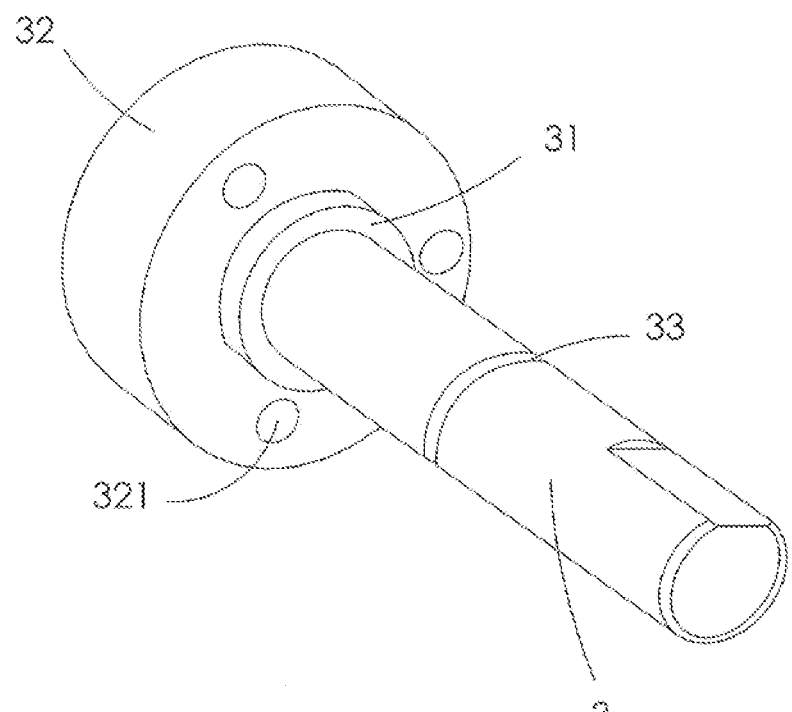
FIG. 7 illustrates an output shaft being a part of the planetary gear transmission of FIG. 3.

Referring to FIG. 4 and FIG. 6, preferably, in the first embodiment, five planetary gear stages are included in the gearbox 1, and each stage has three planet gears 5.

The last stage includes a second internal gear ring 2 coaxially mounted in the gearbox 1, a sun gear 4' located within and coaxial with the second internal gear ring 2, and an output shaft 3 supported by the second internal gear ring 2. The output shaft 3 includes a first shaft shoulder 32 formed at an end thereof close to the planetary gear stages. A plurality of through holes 321 is defined through the first shaft shoulder 32 in an axial direction. A plurality of pins 34 passes through the through holes to connect with a plurality of planet gears 5'. Each of the planet gears 5' is meshed with the sun gear 4' and the second internal gear ring 2. The first shaft shoulder 32 forms the planet carrier for the last stage. The output shaft 3 further includes a second shaft shoulder 31 abutting against an axial face of the second internal gear ring 2.

Figure 3:
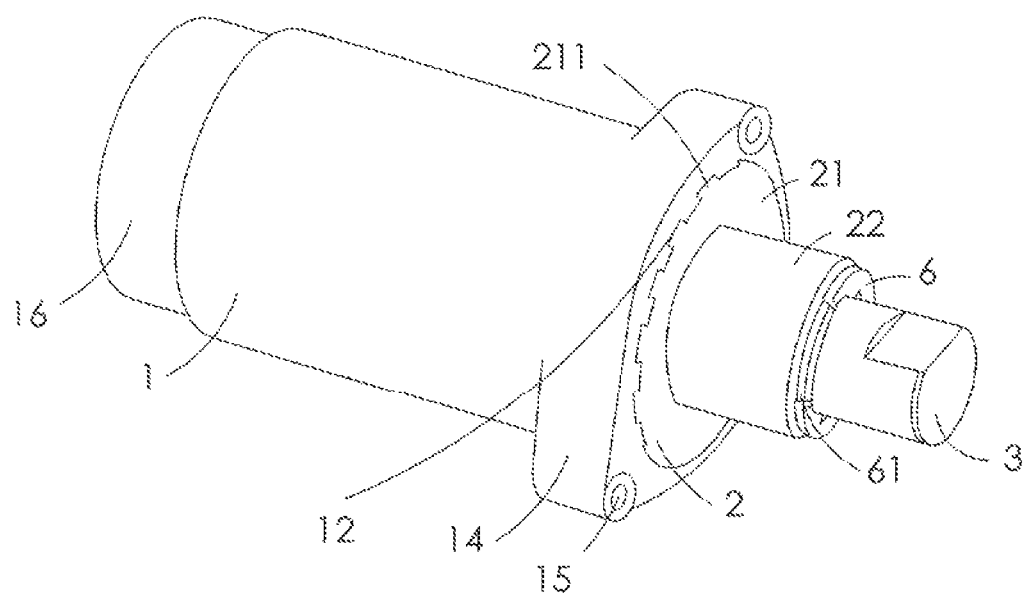
FIG. 3 is a view of a planetary gear transmission according to a first embodiment of the present invention.

As shown in FIG. 3, preferably, in the first embodiment, the first shaft shoulder 32 of the output shaft 3 defines three through holes 321, and the three planet gears 5' of the last stage of planetary gear transmission section are mounted to the output shaft 3 via three pins 34. A retaining ring 6 is disposed on the output shaft 3. The retaining ring 6 is disposed in a groove 33 in the output shaft 3. A washer 61 is disposed between the retaining ring 6 and an end face of the second internal gear ring 2. The retaining ring 6 is used to axially position the output shaft 3, thus preventing axial movement of the output shaft 3.

Figure 5:
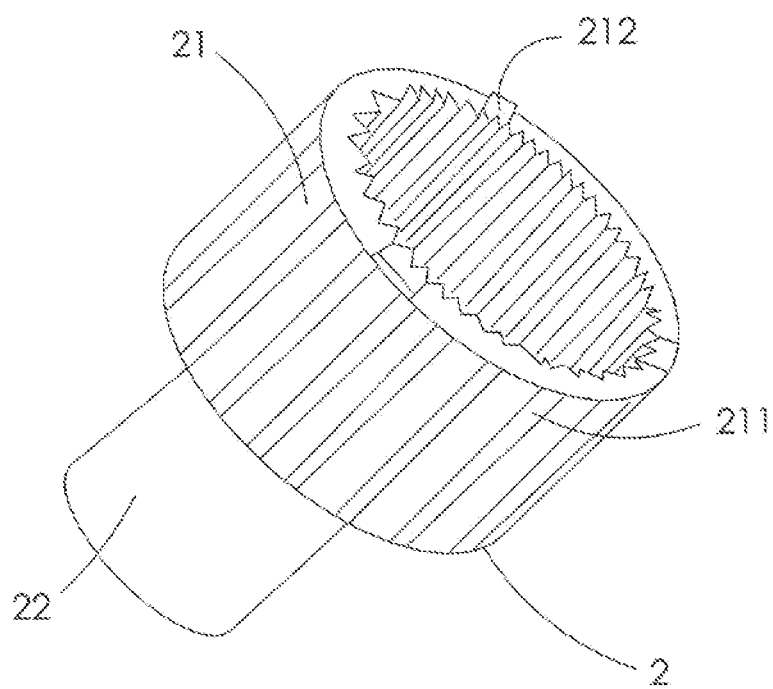
FIG. 5 illustrates a second internal gear ring, being a part of the planetary gear transmission of FIG. 3.

Referring to FIG. 5, the second internal gear ring 2 includes a meshing portion 21 and a support portion 22. The meshing portion 21 is greater in diameter than the support portion 22. An inner surface of the meshing portion 21 is formed with teeth for meshing with the planet gears 5'. The output shaft 3 passes through and is supported by the support portion 22. The support portion 22 acts as and thus replaces a bearing supporting the output shaft 3. Due to the provision of the second internal gear ring 2, the mounting interface of the planetary gear transmission is moved forward (in a direction closer to a power input end of the transmission), which reduces the length of the gearbox 1 as well as the accumulated tolerance. In addition, the second internal gear ring 2 makes it unnecessary to use a separate shaft sleeve or bearing, such that the planetary gear transmission has a simplified and more compact structure, is easier to manufacture, and has a lower cost.

Further, a plurality of spaced, axial ribs 211 is distributed on an outer circumferential surface of the meshing portion 21 of the second internal gear ring 2. An end face of the meshing portion 21 remote from the support portion 22 forms a plurality of protrusions 212 evenly arranged in a circumferential direction of the second internal gear ring 2. The output shaft 3 passes through the support portion 22 of the second internal gear ring 2, with the first shaft shoulder 31 abutting against the axial face of the second internal gear ring 2. A plurality of grooves 12 (FIG. 3) is formed in the inner circumferential surface of the gearbox 1 corresponding to the ribs 211 of the second internal gear ring 2. A plurality of recesses 13 is formed in an end face of the gearbox 1 that contacts the second internal gear ring 2. The ribs 211 on the outer circumferential surface of the second internal gear ring 2 are engaged in the grooves 12, and the protrusions 212 on the end face of the second internal gear ring 2 are engaged in the recesses 13, thus preventing the second internal gear ring 2 from moving circumferentially relative to the gearbox 1. The internal teeth of the second internal gear ring 2 mesh with the planet gears 5' of the last stage. The end face of the meshing portion 21 of the second gear ring 2 adjacent the support portion 22 forms an abutting portion 213 for abutting against a mounting portion of a housing 7 of a device to be driven. Specifically, the abutting portion 213 includes an annular protrusion which is, preferably, coaxial with the second internal gear ring 2.

As shown in FIG. 5, in the first embodiment, preferably, the number of the protrusions 212 and the recesses is three. The provision of the ribs 211 prevents movement of the second internal gear ring 2 in the circumferential direction. The protrusions 212 provide further protection against the circumferential movement of the second internal gear ring 2 when a high torque is outputted.

An outer circumferential surface of the end of the gearbox 1 adjacent the output shaft 3 includes multiple mounting portions 14. Each mounting portion 14 defines a through hole 15 in an axial direction of the gearbox 1. Screws 8 pass through the through holes 15 to connect the planetary gear transmission and the mounting portion of the device to be driven by the output shaft 3. Specifically, the mounting portion is a part of a housing 7. The housing 7 has a plurality of second through holes 72 aligning with the first through holes 15. The housing 7 forms a third through hole 73 corresponding to the support portion 22 of the second internal gear ring 2. The third through hole 73 has a diameter slightly greater than or equal to an outer diameter of the support portion 22 of the second internal gear ring 2, such that the support portion 22 of the second internal gear ring 2 is an interference fit in the third through hole 73. Screws 8 pass through the first through holes 15 and the corresponding second through holes 72 to fixedly connect the housing 7 and the gearbox 1. The support portion 22 of the second internal gear ring 2 passes through the third through hole 73, with the end face of the housing 7 abutting against the annular protrusion 213 of the end face of the second internal gear ring 2 to prevent the second internal gear ring 2 from becoming disengaged from the gearbox 1. Preferably, a detent mechanism is formed between the support portion 22 of the second internal gear ring 2 and the housing 7 to prevent relative rotation there between. For example, first projections, recesses or grooves may be formed on an outer surface of the support portion 22, and second recesses, grooves or projections may be formed on an inner surface of the third through hole 73 of the housing 7 for engaging with the first projections, recesses or grooves. The provision of the detent mechanism allows the torque to be transmitted from the second internal gear ring 2 directly to the housing 7 of the device to be driven.

In the first embodiment, the number of the mounting portions 14 is three, and the number of the second through holes 72 in the housing 7 and the screws 8 is three. It is noted that the embodiment described is not intended to limit the number of these parts to a particular value.

Referring to FIG. 4, preferably, one end of the gearbox 1 remote from the output 3 includes a connecting portion 16 for connecting with a power apparatus such as a motor. The sun gear of the first stage of planetary gear transmission section is fixed to a shaft of the motor, such that the sun gear is driven by the output shaft of the motor for rotation with the motor shaft. An outer diameter of the connecting portion 16 is less than an outer diameter of the gearbox 1.

Preferably, the gearbox 1 is made of plastic by an injection molding process. The second internal gear ring 2 is made of metal preferably by a sintered metal powder process. The two processes are both suitable for mass production of the gearbox 1 and the second internal gear ring 2. The second internal gear ring 2 has a greater torsional strength than that of the housing of the gearbox 1. The second internal gear ring 2 and the gearbox 1 are constructed such that a large part of the torque can be transmitted via the second internal gear ring 2 to the mounting portion of the housing 7 of the device to be driven during operation of the planetary gear transmission, thus reducing the torque load on the housing of the gearbox 1. In addition, the mounting portion of the device to be driven can axially position the second internal gear ring 2 to prevent axial deviation of the second internal gear ring 2.

Figure 8:
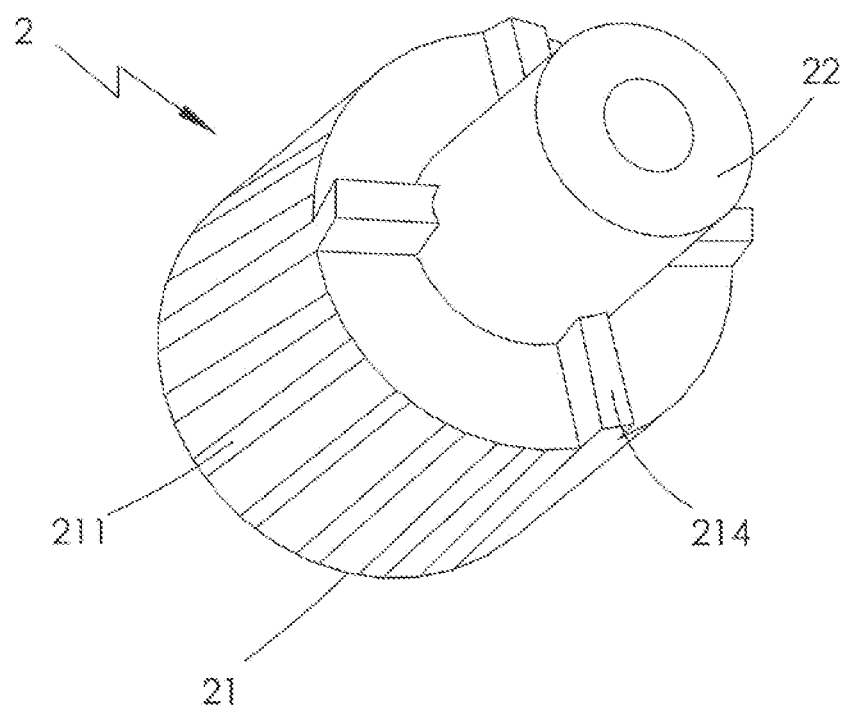
FIG. 8 shows a second internal gear ring of a planetary gear transmission according to a second embodiment of the present invention.

FIG. 8 is a perspective view of a second internal gear ring of a planetary gear transmission according to a second embodiment of the present invention. The second internal gear ring 2 includes a detent mechanism for coupling with the mounting portion of the housing 7 of the device to be driven. Specifically, the end face at the side of the meshing portion 21 of the second internal gear ring 2 adjacent the support portion 22 forms a plurality of radial ribs 214. The ribs 214 are perpendicular to the outer circumferential surface of the support portion 22. Preferably, there are four ribs 214. The provision of the ribs 214 can further strengthen the second internal gear ring 2 and facilitate the engagement with the housing 7. For example, the housing 7 may form recesses or grooves corresponding to the ribs 214. Through the engagement of the ribs with the recesses or grooves, the coupling between the second internal gear ring 2 and the housing 7 can be more easily achieved for torque transmission. It should be understood that the number and shape of the detents of the detent mechanism can vary depending on actual requirements.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A planetary gear transmission comprising:
    a gearbox;
    multiple planetary gear stages mounted in the gearbox; and
    an output shaft mounted at an end of the multiple stages and connected with a last stage of the multiple planetary gear stages;
    wherein, except for the last stage of the multiple planetary gear stages, each of the stages shares a common first internal gear ring formed on or fixed to an inner circumferential surface of the gearbox, each of the stages comprises a sun gear, a planet carrier having multiple axles extending from an end face of the planet carrier, and a plurality of planet gears respectively mounted on the axles and meshed with the respective sun gear and the first internal gear ring;
    wherein the last stage of the multiple planetary gear stages comprises a second internal gear ring mounted in the gearbox, a sun gear located within the second internal gear ring, and a plurality of planet gears meshing with the second internal gear ring and the respective sun gear, the output shaft forming a planet carrier rotatably supporting the planet gears of the last stage;

wherein, except for the first stage of the multiple planetary gear stages, the sun gear of each of the stages is integrally formed with or fixed to the planet carrier of an immediately preceding stage;

wherein the second internal gear ring comprises a support portion, and the output shaft passes through and is rotatably supported by the support portion, and wherein the second internal gear ring has a torsional strength greater than that of a housing of the gearbox.

2. The planetary gear transmission of claim 1, wherein the output shaft comprises a first-shaft shoulder at an end of the output shaft close to the planetary gear stages, a plurality of through holes is defined through the first shaft shoulder, a plurality of pins passes through the through holes to connect to the planet gears of the last stage.

3. The planetary gear transmission of claim 2, wherein the output shaft comprises a second shaft shoulder at the end of the output shaft close to the planetary gear stages, the second shaft shoulder abuts against an end face of the second internal gear ring in an axial direction of the output shaft.

4. The planetary gear transmission of claim 3, wherein a groove is formed in one end of the output shaft extending out of the support portion of the second internal gear ring, a retaining ring is disposed in the groove, the diameter of the second shaft shoulder is greater than the diameter of the output shaft, and the diameter of the first shaft shoulder is greater than the diameter of the second shaft shoulder.

5. The planetary gear transmission of claim 4, wherein a washer is disposed between the retaining ring and an end face of the support portion of the second internal gear ring.

6. The planetary gear transmission of claim 1, wherein the second internal gear ring further comprises a meshing portion at one end of the support portion, the meshing portion is greater in diameter than the support portion, an inner surface of the meshing portion is formed with internal teeth for meshing with the planet gears of the last stage, and the meshing portion is mounted in the gearbox.

7. The planetary gear transmission of claim 6, wherein axial ribs are formed on an outer circumferential surface of the meshing portion of the second internal gear ring, protrusions are formed on an end face of the meshing portion remote from the support portion, the inner circumferential surface of the gearbox forms multiple grooves corresponding to the ribs of the second internal gear ring, an end face of the gearbox that contacts the second internal gear ring forms multiple recesses, the ribs are respectively engaged in the grooves, and the protrusions are respectively engaged in the recesses.

8. The planetary gear transmission of claim 6, wherein an end face of the meshing portion close to the support portion forms an annular protrusion that is coaxial with the second internal gear ring.

9. The planetary gear transmission of claim 1, wherein an outer circumferential surface of an end of the gearbox adjacent the output shaft comprises multiple mounting portions, and each mounting portion defines a through hole in an axial direction of the gearbox.

10. The planetary gear transmission of claim 1, wherein a material of the gearbox is plastic, and the second internal gear ring is metal and made by a sintered metal powder process.

11. A planetary gear transmission assembly comprising a motor and the planetary gear transmission of claim 1, wherein the planetary gear transmission is driven by the motor.

12. A planetary gear transmission comprising:
a gearbox;
multiple planetary gear stages mounted in the gearbox; and
an output shaft mounted at an end of the multiple stages and connected with a last stage of the multiple planetary gear stages,
wherein, except for the last stage of the multiple planetary gear stages, each of the stages shares a common first internal gear ring formed on or fixed to an inner circumferential surface of the gearbox, each of the stages comprises a sun gear, a planet carrier having multiple axles extending from an end face of the planet carrier, and a plurality of planet gears respectively mounted on the axles and meshed with the respective sun gear and the first internal gear ring,
wherein the last stage of the multiple planetary gear stages comprises a second internal gear ring mounted in the gearbox, a sun gear located within the second internal gear ring, and a plurality of planet gears meshing with the second internal gear ring and the respective sun gear, the output shaft forming a planet carrier rotatably supporting the planet gears of the last stage,
wherein, except for the first stage of the multiple planetary gear stages, the sun gear of each of the stages is integrally formed with or fixed to the planet carrier of an immediately preceding stage,
wherein the second internal gear ring comprises a support portion, and the output shaft passes through and is rotatably supported by the support portion, and
wherein the second internal gear ring includes a detent mechanism for coupling with a device to be driven by the output shaft such that torque is transmittable via the detent mechanism to the device to be driven.

13. The planetary gear transmission of claim 12, wherein the detent mechanism comprises multiple projections, recesses or grooves formed on an outer circumferential surface of the second internal gear ring for engaging with the device to be driven.

* * * * *